United States Patent
Momoh (10) Patent No.: US 8,244,406 B2
(45) Date of Patent: Aug. 14, 2012

(54) SYSTEM AND METHOD OF MONITORING AND OPTIMIZING POWER QUALITY IN A NETWORK

(75) Inventor: James Momoh, Upper Marlborough, MD (US)

(73) Assignee: Howard University, Washington, DC (US)

( * ) Notice: Subject to any disclaimer, the term of this patent is extended or adjusted under 35 U.S.C. 154(b) by 638 days.

(21) Appl. No.: 12/425,764

(22) Filed: Apr. 17, 2009

(65) Prior Publication Data

US 2010/0268579 A1 Oct. 21, 2010

(51) Int. Cl.
*G05D 11/00* (2006.01)
(52) U.S. Cl. .......... 700/291; 700/286; 703/18; 705/14.1
(58) Field of Classification Search .................. 700/291, 700/292, 293; 705/14.1; 703/18
See application file for complete search history.

(56) References Cited

U.S. PATENT DOCUMENTS

| | | | |
|---|---|---|---|
| 7,130,719 B2 * | 10/2006 | Ehlers et al. ................. | 700/276 |
| 2003/0093390 A1 * | 5/2003 | Onoda et al. ................. | 705/412 |
| 2003/0205938 A1 | 11/2003 | Andarawis et al. | |
| 2005/0033481 A1 * | 2/2005 | Budhraja et al. ............. | 700/286 |
| 2007/0192078 A1 | 8/2007 | Nasle et al. | |

OTHER PUBLICATIONS

International Search Report for PCT/US2010/030244 dated Apr. 7, 2010.

* cited by examiner

*Primary Examiner* — Mohammad Ali
*Assistant Examiner* — Sheela S Rao
(74) *Attorney, Agent, or Firm* — Fitch, Even, Tabin & Flannery (57) ABSTRACT

The operation of a power distribution network is modeled. At least one quality of the operation of the power distribution network is measured. The future operational performance of the power distribution network is predicted based at least in part upon the modeling. When the at least one measure of the quality of the operation of the power distribution network or the predicted future operational performance do not meet the predetermined performance criteria, corrective action is taken with respect to the power distribution network.

17 Claims, 7 Drawing Sheets

SYSTEM AND METHOD OF MONITORING AND OPTIMIZING POWER QUALITY IN A NETWORK

FIELD OF THE INVENTION

This application relates to approaches that determine the quality of power in electrical systems or electrical networks and, more specifically, to approaches that control and optimize the power quality in these systems and networks.

BACKGROUND

Various types and configurations of networks are used to transmit power from power sources (e.g., power generation facilities operated by utilities and/or independent power producers (IPPs)) to end users (e.g., residential consumers). Customers typically desire power that is reliable and clean and the quality of the power is typically a measure of the reliability and cleanliness of the power. Reliability typically refers to the power being supplied without interruptions or outages. Cleanliness of the power often refers to the power being delivered at a constant voltage and at a constant frequency (e.g., 60 cycles/second frequency, which in the United States is the standard operating frequency). Other measures may also be used to describe power quality.

The quality of the power delivered to the end user affects the performance of the equipment that receives and uses the transmitted power. For example, if voltage surges are present in the transmitted power, the equipment can be disabled or destroyed by these voltage surges. To take a specific example, sensitive semiconductor devices within various appliances or other types of equipment typically used by consumers can be easily disabled, destroyed, or otherwise negatively impacted by these voltage surges.

Residential customers have been increasingly concerned with the quality of the power that they receive. For example and as mentioned above, the various appliances they use have increasingly sensitive electronic components that can be easily damaged or destroyed by voltage surges. Undesirable power quality also tends to result in the waste of energy, which unnecessarily increases the power costs for all consumers. Utilities also suffer when energy is wasted.

Unfortunately, previous power monitoring systems have addressed only industrial concerns. These previous approaches have also been inflexible and have not allowed automatic or manual adjustments to be made that alter and maintain the power quality. As such, residential and other users do not have the ability or flexibility to perform monitoring and make real-time adjustments at their residence or other place of usage. Consequently, problems associated with inadequate power quality continue to occur and this, in turn, results in damaged devices, wasted energy, and other inefficiencies.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Approaches are provided that measure and optimize the quality of power in a network (or a portion of a network) and allow a user to make real-time adjustments to the configuration, loading, and/or other operating characteristics of the network in order to maintain or achieve adequate or desirable power quality. The adjustments may be made automatically or manually by a user and are flexible and user-friendly. The present approaches also prevent damage to network devices and/or inefficiencies in network operation from occurring. In addition, these approaches allow for the diagnosis of equipment to pre-empt appliance/equipment failure.

In many of these embodiments, the operation of a power distribution network is modeled. Various approaches may be used to accomplish this modeling and the model may be stored in a memory storage device. A quality of the operation of the power distribution network is measured and it is determined if the measured quality meets a predetermined performance criteria. The future operational performance of the power distribution network is also predicted based at least in part upon the modeling. When the quality of the operation of the power distribution network and/or the predicted future operational performance do not meet the predetermined performance criteria, corrective action is taken with respect to the power distribution network. The corrective action achieves or maintains an adequate or desired power quality.

The corrective actions can take a variety of different forms. For example, the corrective action may include removing and replacing a component of the power distribution network. In another example, the corrective action may include deactivating a component of the power distribution network. Other examples of corrective actions are possible.

The apparatus that monitors and optimizes power in the network can be positioned in a variety of different places. In one example, the power distribution network is located in a home. Within the home, the apparatus is coupled to one or more appliances via the electrical wiring in the home. In some examples, a single power monitoring and optimization apparatus may be coupled to the entry point of power in to the home (e.g., at a meter or circuit breaker board). In still another example, a separate device may be placed within different appliances in the home. Other examples of placement for the power monitoring and optimization devices are possible.

In other examples, an adjustment to an operation of one or more appliances connected in the power distribution network may be determined. When the measure or measures of the quality of the operation of the power distribution network do not meet a performance threshold, the adjustment is communicated to the appliances utilizing an existing component of the power distribution network. For example, the adjustment may be communicated along existing electrical wiring in the house. When received, the appliance may automatically adjust operation (e.g., the appliance may be temporarily or permanently deactivated). In other examples, a user manually adjusts the devices.

The consumer or user may also be presented with a choice of corrective action to take at a communication interface (e.g., a touch screen device). In addition, the consumer or user may be rewarded for taking certain corrective actions and rewards may be presented to the consumer or user to encourage the user to take corrective actions in general or certain corrective actions in particular. Punishments may also be communicated to the user in the case where the user elects not to take corrective actions.

Various types of appliances can also be used in the networks described herein and the power monitoring and optimization apparatus may be coupled or otherwise connected to these appliances. For example, the appliance may be a television, a radio, a refrigerator, an oven, a microwave, or a refrigerator. Other examples of appliances are possible.

Figure 1:
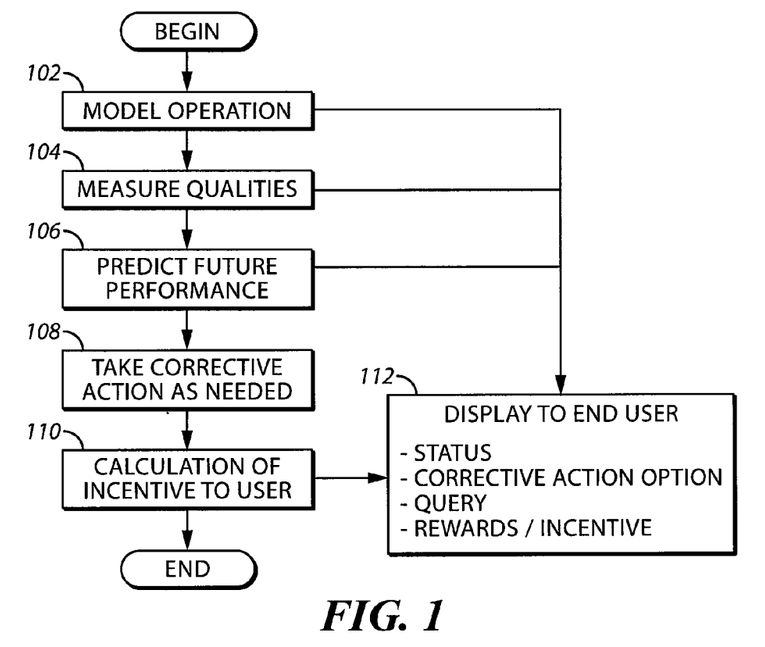
FIG. 1 comprises a flowchart describing an approach for monitoring power and optimizing power quality in a network according to various embodiments of the present invention.

Referring now to FIG. 1, one example of an approach for monitoring and optimizing power quality in a network is described. At step 102, the operation of a power distribution network is modeled and a model is created. Various approaches may be used to accomplish this modeling and one example of a model is described herein with respect to FIG. 2. After the model is created, the model may be stored in a memory storage device. Based upon inputs received, the model is used to determine the existing state of the system and predict future system performance.

It is desirable that the system be able to meet the continually changing load demand for active and reactive power while supplying energy at minimum cost and with minimum ecological impact. Maintaining an adequate or desirable power quality in part allows these goals to be achieved. Under various operating conditions, the approaches described herein ensure that power quality meets certain minimum predefined standards for factors such as constancy of frequency, constancy of voltage, and level of reliability to name a few examples. At step 104, one or more measures of a quality of the operation of the power distribution network are measured.

For the examples described herein, three states of operation occur: normal ($S_N$) operation, emergency ($S_E$) operation, and restorative ($S_R$) operation. Other states of operation are possible. For each state of operation, there are corresponding limits to the power quality measures and the measured qualities may be eventually compared against these predetermined limits to determine if adequate power quality is being provided to the consumer or user.

In the present example, the measures of power quality (for each of the states) are subdivided into various types. A first type of power quality measure includes voltage measures such as sags and swells, undervoltages and overvoltages, and flickers, to name a few examples. A second type of power quality measure includes transients and frequency measures. A third type of power quality measure includes power measures such as power flows and power losses. A fourth type of power quality measures include harmonic measures such as Total Harmonic Distortion (THD) and Total Demand Distortion (TDD) to name two examples. Some or all of these measures can be used as indications of power quality. Moreover, the measures and their limits can change from state-to-state.

In one example, the voltage measure indicates a change of voltage:

$$\text{Voltage Change, } V_{change} = f(V_i, t_{dur}, n_{sag})$$

where $V_i$ is the magnitude of the voltage at a bus i (or other measurement point), $t_{dur}$ is the duration of event where voltage; and $n_{sag}$ is the counter for such events.

In one example, the voltage change is measured in two locations in the present examples: at the meters (e.g., the service voltage is at the junction between individual end user and distribution secondary feeder) and the appliance terminals (e.g., the utilization voltage). Other measurement points are possible. As set by the ANSI voltage standards (ANSI C84.1-1995), a threshold exists for the acceptable voltage change as shown in Table 1.

TABLE 1

ANSI Voltage Standards for Voltage Change as percentage of nominal voltage

| | Service Voltage: at meter | | Utilization Voltage: at terminals | |
|---|---|---|---|---|
| | Minimum, $V_i$ | Maximum, $V_i$ | Minimum | Maximum |
| Range A | −5% | +5% | −8.3% | +4.2% |
| Range B | −8.3% | +5.8% | −11.7% | +5.8% |

Table 2 shows one possible example of voltage measures to be utilized, and the ranges for such event and limit(s) under varying states. The ranges are identified by various IEEE standards.

TABLE 2

IEEE Standards for Voltage Measures

| Voltage Measures | | Range |
|---|---|---|
| Voltage sag, | $V_{sag,i}$ | $0.1 \leq V_{sag,i} \leq 0.9$ p.u. |
| $V_{sag}$ | $t_{sag,dur}$ | $0 < t_{sag,dur} \leq 60$ s |
| Voltage Swell, | $V_{swell,i}$ | $1.1 \leq V_{swell,i} \leq 1.8$ p.u. |
| $V_{swell}$ | $t_{swell,dur}$ | $0 < t_{swell,dur} \leq 60$ s |
| Undervoltage, $V_{under}$ | $V_{under,i}$ | $0.8 \leq V_{under,i} \leq 0.9$ p.u. |
| | $t_{under,dur}$ | $t_{under,dur} \geq 60$ s |
| Overvoltage, | $V_{over,i}$ | $1.1 \leq V_{over,i} \leq 1.2$ p.u. |
| $V_{over}$ | $t_{over,dur}$ | $t_{over,dur} \geq 60$ s |

As for transient and frequency measures of power quality, transient over voltages can be observed as a result of electrical switching (e.g. capacitor switching and lightning). In the present examples, transients are classified by the frequency of their content, the typical duration of the transient, and the energy content of the transient. Other classification approaches may also be used. The measure of the energy content, E is viewed as a function of voltage integrated over time.

$$E = \int [v(t)]^2 \cdot dt$$

Where E is the energy content; v(t) is the transient voltage (function of time), and t is the time (usually in the range ns→s).

CBEMA voltage tolerance curves and the ITIC curves are accepted in the IEEE standards 446-1995 and 1100-1999, and these may be used to determine the acceptable voltage/duration levels for the systems.

As for flow and loss measures of power quality, electrical losses on the transmission and distribution system are incurred when supplying power to these customers. These losses are typically from 7% to 12% of customer energy consumption and as much as 50% of total system reactive requirements.

The power flow and losses in the transmission lines can also be considered. For a line connecting bus, i to j:

$$P_{ij}^{min} \leq P_{ij} \leq P_{ij}^{max} \text{ and } Q_{ij}^{min} \leq Q_{ij} \leq Q_{ij}^{max}$$

$$P_{loss}^{min} \leq P_{loss} \leq P_{loss}^{max} \text{ and } Q_{loss}^{min} \leq Q_{loss} \leq Q_{loss}^{max}$$

As for harmonic measures of power quality, harmonics are introduced to the system by non-linear devices and with the increased injection of such loads in residences. The change in the shape of the waveform has implications on the quality of power and as such is a power quality measure. The harmonics may be a measure with regards to both voltage harmonics and current harmonics.

Indices of harmonic distortion that can be used as measures may be calculated by the equations described below. More specifically, Total Harmonic Distortion (THD) is given by:

$$THD = \frac{\sqrt{\sum_{h>1}^{h_{max}} I_h^2}}{I_1}$$

and Total Demand Distortion (TDD) is given by:

$$TDD = \frac{\sqrt{\sum_{h=2}^{h_{max}} I_h^2}}{I_L}$$

where $I_L$ is the peak or maximum demand load current at the fundamental frequency measured at a point of common coupling (PCC), which is defined in one example in the IEEE standard 1547 as the point of which the local electrical power system (i.e., the individual user's premises) meets the area power system.

For individual end users, IEEE Standard 519-1992 limits the level of harmonic current injection at the point of common coupling (PCC). Where $I_L$=average of maximum demand current for previous 12 months, then THD and TDD are limited to:

$$THD \leq THD^{max}$$

$$TDD \leq TDD^{max}$$

The maximum THD threshold values and the TDD threshold values are pre-determined based on the network inputs.

At step 106, the future operational performance of the power distribution network is predicted based at least in part upon the modeling. Several methods for prediction of operational performance exist. For instance, short term forecast methods can be utilized and include regression, time series, neural networks, expert systems, fuzzy logic and statistical learning algorithms. In one example, the anticipatory techniques of Adaptive Dynamic Programming (ADP) are utilized. In particular, the ADP method has been utilized for the solving unit commitment, sensor placement and network reconfiguration problems and will be utilized to overcome shortfall of classical methods. The above-mentioned technique is well known to those skilled in the art and will not be discussed in greater detail herein.

At step 108, when the at least one measure of the quality of the operation of the power distribution network and/or the predicted future operation performance do not meet the predetermined performance criteria, a corrective action is taken with respect to the power distribution network. More specifically, measured qualities in the system (e.g., voltages) and future predicted performance (e.g., predicted voltages) are compared against predetermined criteria (e.g., compared against the ranges in Table 2) and corrective actions can be taken if the value lies outside the acceptable ranges.

In one example, the event that causes a corrective action to be taken may be a voltage violation. Corrective action in response to voltage violations in the power network may be executed via direct control (e.g., where the utility controls an end users device by supervisory control) or indirect control (e.g., where load shifting is at the discretion of a customer). This later approach provides customer-controlled load management via informed indirect control, which, in turn, allows customer decisions to benefit both the customer and the utility.

The particular corrective action or actions may take a variety of forms including load deferral, load curtailment, self generation, and energy storage. In load deferral, a load may be disconnected temporarily or permanently from the network. In load curtailment, a load may be operated at another power level. Self-generation may allow additional power to be provided. Energy storage allows power to be stored for future use.

Various modes of correction can be used. These modes include remedial action, reconfiguration and restoration. These modes, in turn, may utilize the various corrective actions described herein.

Remedial action, in some cases, may be the first of several potential corrective actions to be undertaken. This option may be particularly effective in meeting power quality objectives where the violation is not immediately detrimental to the network and/or when reconfiguration actions have already been initiated. In this mode, end-users (e.g., residential customers) may be given the option to make a decision as to the action that is to be taken.

Approaches for reconfiguration are used that include load management or energy injection options to potentially mitigate/preempt degradation of power quality. In this mode, end users may be given authority to select a particular action to be taken.

Restoration mode, in some examples, involves system reconfiguration steps which may be required after restoration of the system is needed. This approach encompasses load management approaches, switching to off-grid power supplies, as well as communication with utility. In this mode, customers may or may not be given the opportunity to make decisions, depending on the severity of the event.

One example of power quality objectives and constraints of the following types are shown in Table 3.

TABLE 3

Objective Functions and Constraints

| Objectives | Constraints |
|---|---|
| Loss Minimization $$\text{Min } I^2 r = \sum_{ij} r_{ij} \frac{P_{ij}^2 + Q_{ij}^2}{|V_i|^2}$$ | Branch Flow Equations: $Y_{i+1} = f_{i+1}(Y_i)$ where $Y_i = [P, Q, |V|^2, X_k, Q_s, \delta_i]$ |
| $$\text{Min } P_L = \sum_{k=1}^{N_l} P_{l_k}.$$ $$P_{l_k} = g_k[V_i^2 + V_j^2 - 2V_iV_j\cos(\theta_i - \theta_j)] \quad k = 1, \ldots, N_l.$$ | Power Equality Constraints: $$P_i - \sum_{i \in gen} P_{g_i} + P_{d_i} = 0 \quad i = 1, \ldots, N_b$$ $$Q_i - \sum_{i \in gen/synch} Q_{gi} + Q_{d_i} = 0 \quad i = 1, \ldots, N_b$$ Inequality Constraints: |
| Load Balancing $$\text{Max} \frac{S_i}{S_{i\,max}}$$ Voltage Optimization $$\text{Min } F(\upsilon) = \sum_{i=1}^{N_b} (V_i - V_{i,nom})^2$$ | Voltage Limits $\|V_i^{min}\| \leq \|V_i\| \leq \|V_i^{max}\|$ Current Limits $\|I_{ij}^{min}\| \leq \|I_{ij}\| \leq \|I_{ij}^{max}\|$ Capacitor Control Limits $Qs_i^{min} < Qs_i \leq Qs_i^{max}$ Curtailable Load Control Limits $P_i \times X_{ki} \leq Pc_{ki}$ $Q_i \times X_{ki} \leq Qc_{ki}$ Where: N: Total number of buses $P_{ij}, Q_{ij}$: Transfer Power (branch i-j at pu) $V_i$: Voltage of bus i (pu) $P_L$: Total active power loss $P_{l_k}$: Active power loss in branch k $Q_{l_k}$: Active power loss in branch k $S_i$: Apparent power at load i $g_k$: Series conductance of line k $F(v)$: Objective function $V_{i,nom}$: Nominal voltage |

At step, 110 a calculation of an incentive may be performed. This may include an incentive for the user to take corrective action and/or a disincentive not to take the action, to name two examples. At step 112, a display of various types of information may be made to the end user. The information to be displayed may include the status, corrective action option, a query, or the rewards/incentive to name a few examples. Other examples of information may also be displayed.

Figure 2:
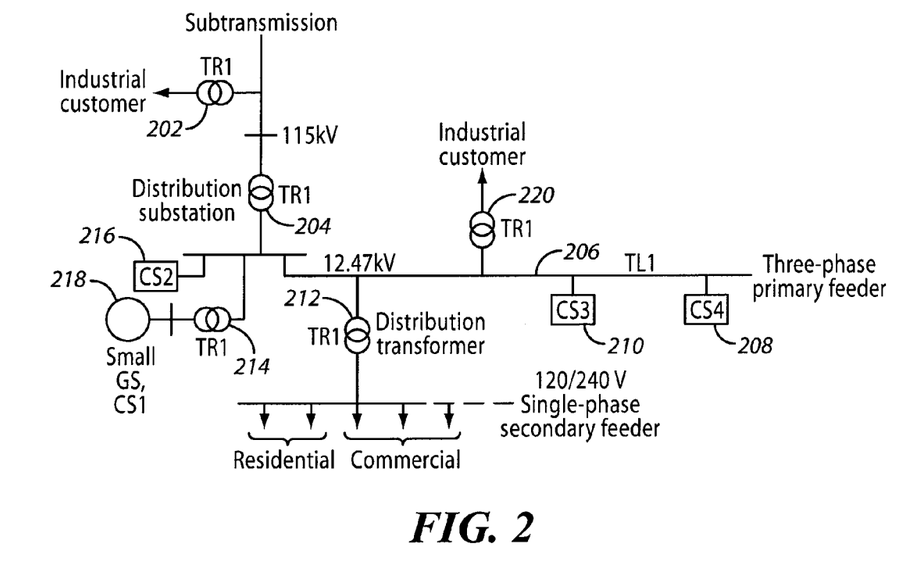
FIG. 2 comprises a block diagram of a model of a power distribution network according to various embodiments of the present invention.

Referring now to FIG. 2, one example of a power distribution network model 200, for example, as described with respect to step 102 of FIG. 1 is described. The network model 200 includes a first transformer 202 that is coupled to a distribution substation 204. A transmission line 206 is coupled to a photovoltaic energy resource 210, a wind energy renewable energy resource 208, a distribution transformer 212, a distribution transformer 214, and a synchronous generator 216. The distribution transformer 214 is coupled to a co-generator 218. The distribution transformer 212 is coupled to residential and commercial users. A transformer 220 is coupled to an industrial user. It will be appreciated that this is one example of a power distribution network and that other examples are possible.

The model 200 simulates the functioning of its elements. The end-user receives electric power which is generated at generating stations, and is transmitted to consumers through the network and the devices including transmission lines, transformers, and switching devices. The customers or end users are located in the distribution portion of the power network.

In particular, the distribution portion of the power network is the final stage in the transfer of power to the individual customers and the secondary distribution feeders will supply residential and commercial customers at 120-240V. Injection of Distributed Resources (DRs), such as Renewable Energy Resources (RERs) including photovoltaic resources 210, wind energy resources 208 and power from these elements may be injected at the distribution level as shown in FIG. 2. The models for the components shown in FIG. 2 are given in Table 4.

Various distribution system topologies may also be considered in any model and these topologies may include radial, mesh or radial mesh topologies. In addition, the network is assumed to have appropriate communication technology. Pre-existing distribution automation functions such as support trouble call analysis may also be provided. Among the principal categories of electric end-use equipment are lighting equipment, space conditioning systems, electric communications and computing devices, machine tools, and electrolytic devices to name a few examples.

A residential customer may be categorized by the number and type of their appliances, their cooling and heating systems, their lighting systems and devices, to name a few examples. The specific components of the network are modeled. Some of the generic components to be used are listed in Table 4.

TABLE 4

Component Models for selected Components

Generators and Distributed Resources (DRs)

| Component | Equation | Description |
|---|---|---|
| Co-generator, CS1 | $I_{lk} = \left(\dfrac{S_{lk}}{V_k}\right)^*$ for a constant load $I_{Gk} = \left(\dfrac{S_{Gk}}{V_k}\right)^*$ (voltage-controlled source) | $I_{lk,gk}$ – load/generator current $S_{lk,Gk}$ – apparent power for load/generator $V_k$ – voltage |
| Synchronous Generator, CS2 | $Q_{specified} = \|V_i^t\| \left[\dfrac{V_{Re(i)} - V_i^t}{X_{fictitious(i)}}\right]$ | $V_i^t$: Calculated voltage at iteration t $V_{fictitious_{i,t}}$: Calculated value of voltage at fictitious node at t iteration $X_{fictitious_i}$: Fictitious branch impedance of node i $Q_{spec}$: Fictitious reactive power at specified voltage |
| Photovoltaic (PV) Systems, CS3 | $Q_{spec} = \pm\sqrt{\|I\|^2(e^2+f^2) - P_{spec}^2}$ | where V = e + jf is used. $P_{spec}$ and $Q_{spec}$ are given. |
| Wind Power systems, CS4 | $P = \dfrac{1}{2}\rho\pi R^2 V^3 C_p$ | where P: air density R: turbine radius V: speed $C_p$: turbine power coefficient, which represents the power conversion efficiency of a wind turbine. λ: Ratio of the tip speed of the machine turbine blades to wind speed. $$\lambda = \dfrac{R\Omega}{V}$$ Ω: speed of the wind speed of turbine |

Line and Transmission Components

| Component | Equation | Description |
|---|---|---|
| Power Transformers, TR1 | $\begin{bmatrix} I_k \\ I'_k \end{bmatrix} = \begin{bmatrix} Y_k^{pr} & Y_k^{ps} \\ Y_k^{sp} & Y_k^{ss} \end{bmatrix} \begin{bmatrix} V_{k-1} \\ V_k \end{bmatrix}$ | where $V_{k-1} = (Y_k^{sp})^{-1}[I'_k - Y_k^{ss}]$ $I_k = Y_k^{pp}V_{k-1} + Y_k^{ps}V_k$ |
| Line Model, TL1 | $\begin{bmatrix} V_{k-1} \\ I_k \end{bmatrix} = \begin{bmatrix} V_k + Z_k\left(\dfrac{Y_k}{Z}V_k\right) - I'_k \\ \dfrac{Y_k}{Z}(V_k + V_{k-1}) - I'_k \end{bmatrix}$ | (as above) |
| Shunt Capacitor Model, SC1 | $I_{ck} = Y_{ck}V_k$ at bus k | where $I_{ck}$ is the injected current $Y_{ck}$ is the admittance of bus k $V_k$ is voltage |
| Switch Model, SM | $V_{k-1} = V_k$ $I_k = -I_k$ | (as above) |

Load Models

| Component | Equation | Description |
|---|---|---|
| Constant Power Loads, $LT_1$ | $k_1 = k_2 = 0$ $P = P_o V^{k_1} \quad Q = Q_o V^{k_2}$ $S_{Lk} = P_{Lk} - jQ_{Lk}$ $I_{Lk} = \left(\dfrac{S_{Lk}}{V_k}\right)^*$ | where $P_{Lk}, Q_{Lk}$ are constant values of active and reactive power at the bus k. |
| Constant Current Loads, $LT_2$ | $k_1 = k_2 = 1$ $S_{Lk} = V_k I_{LK}^* = \|V_k\|(a_{Lk} + jb_{Lk})$ | where $a_{Lk}, b_{Lk}$ are constant values of active and reactive currents. |

TABLE 4-continued

Component Models for selected Components

| Constant Impedance Loads, $LT_3$ | $k_1 = k_2 = 2$ $$S_{Lk} = V_k \left(\frac{V_k}{Z_{Lk}}\right)^* = \frac{[V_k]^2}{Z_{Lk}} = \frac{[V_k]^2}{r_{Lk}^2 + X_{Lk}^2}[r_{Lk} + jX_L]$$ $$I_{Lk} = \frac{V_k}{Z_{Lk}}$$ | where $r_{Lk}, X_{Lk}$ are constant values of active and reactive load impedance. |
|---|---|---|

As mentioned, the model may be stored in memory and is used to model the reaction of the system to various inputs and thereby predict future performance.

Figure 3A:
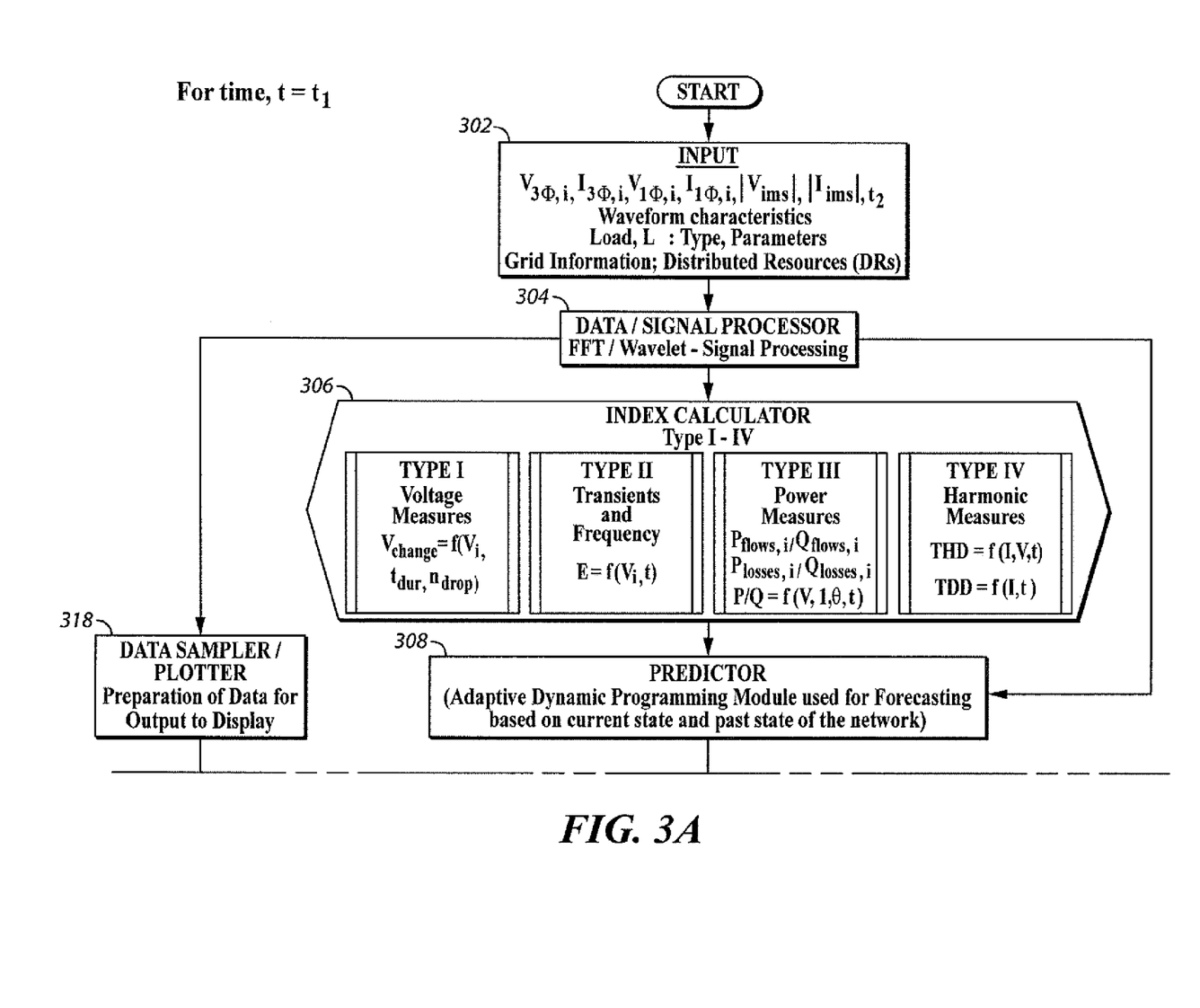
FIG. 3 comprises a flowchart describing an approach for monitoring and optimizing power quality in a network according to various embodiments of the present invention.
Figure 3B:
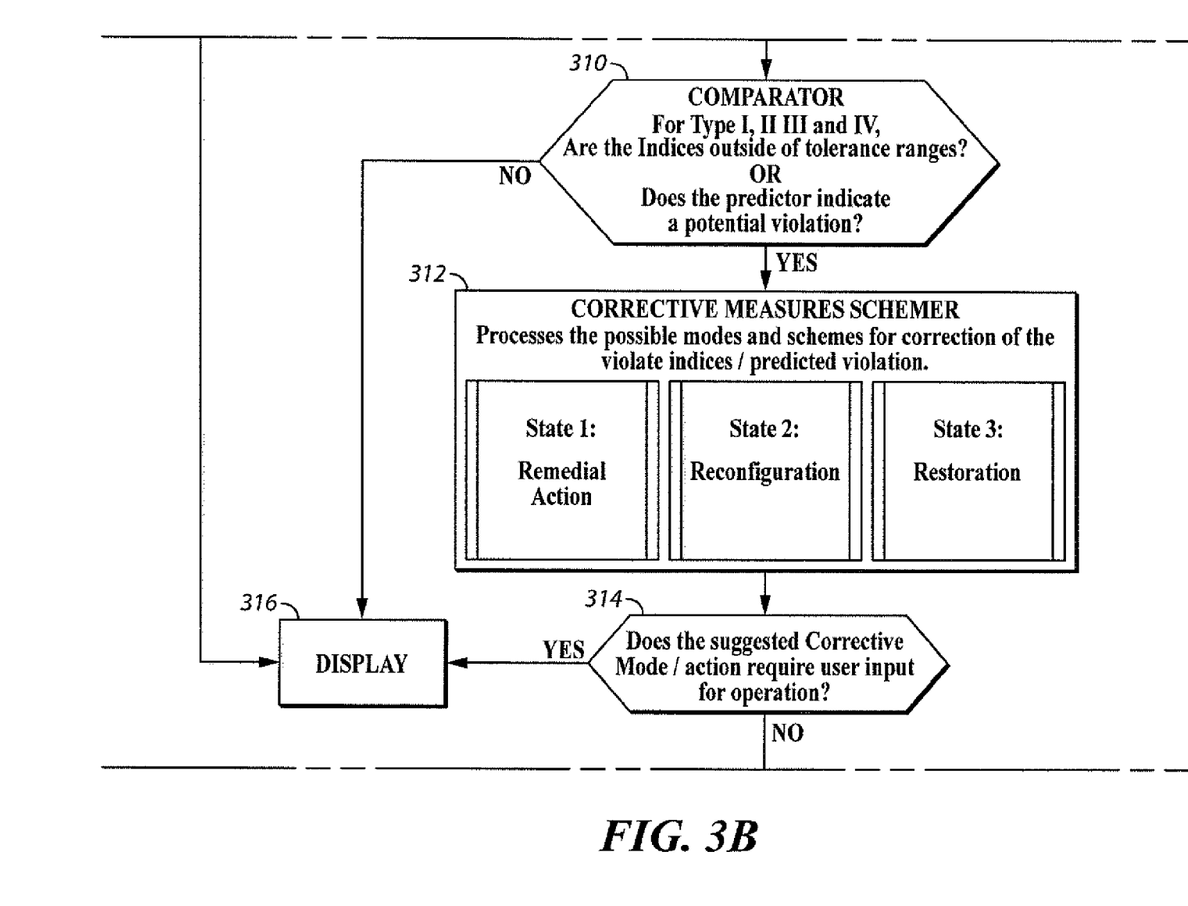
Figure 3C:
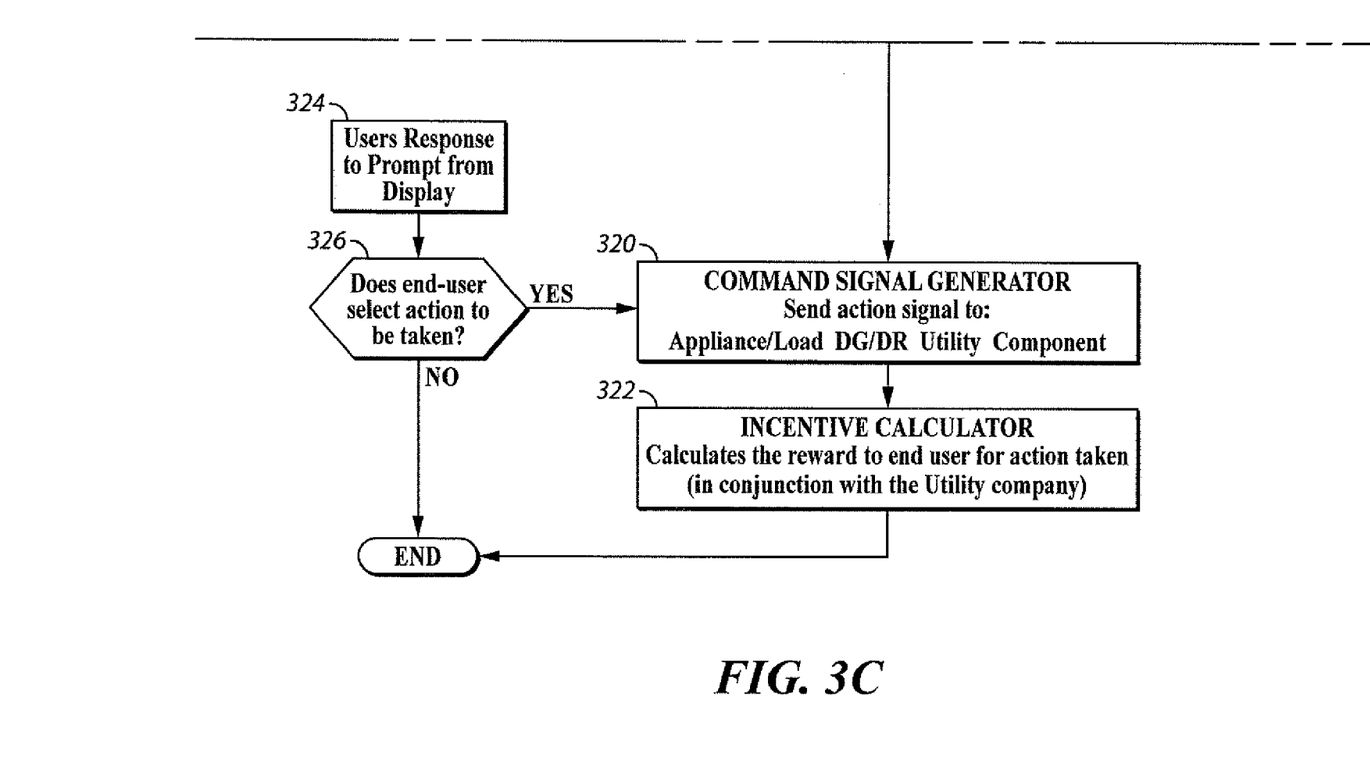

Referring now to FIG. 3, one example of the operation of the system for one iteration at time $t_1$ is shown. At block 302, various inputs are received. These inputs include measurements of currents, voltages, waveform characteristics, load information, grid information, and information pertaining to distributed resources. Other input information may also be received. These inputs may be received from various sensors or sensing arrangements placed at different positions throughout the network.

At block 304, a data signal processor performs data and/or signal processing on some or all of the inputs. This allows an index (or indices) to be determined.

At block 306, an index calculator determines an index (or indices) based upon the received inputs. As mentioned above, the index (or indices) may be a voltage measure, a transient and frequency measure, a power measure, or a harmonic measure. Other examples of indices are possible. This processed data may be fed to a predictor block 308 (described below) and a data sampler/plotter block 318, which prepares data for output on a display at block 316. The data sampler/plotter block 318 samples the processed data for display to an end-user (e.g., a residential consumer). This component may generate graphical information, which is presented to the end-user for decision-making purposes.

At block 308, a predictor module forecasts the performance of the network. For example, Adaptive Dynamic Programming (ADP) and the model may be used to predict and adapt system or network performance based upon the current state of the system and the past state of the system.

At block 310, a comparator is used to determine whether any of the indices is outside a predetermined range. In addition or alternatively, a determination can be made if the predictor indicates a potential violation of the predetermined limits. If the answer at block 310 is negative, then execution continues at block 316 where the results can be displayed to a user.

If the answer at block 310 is affirmative, then at block 312 a corrective measures schemer determines and instigates the taking of corrective measures. This block processes the possible modes and approaches for correction of the indices that either violate the limit or are predicted to violate the limit.

At block 314, a determination is made as to whether the suggested correction requires user input and/or interaction. If the answer is affirmative, execution continues at block 316 as described above where a prompt is issued to a user on the display. At block 324, a user response occurs in response to the prompt on the display. At block 326, a determination is made as to whether end user select action has to be taken. If none needs to be taken, execution ends. However, if the answer is affirmative, execution continues at block 320.

If either of the answers at block 314 or 326 are affirmative, at block 320, the signal generator generates an action signal to be sent to the appliances, generator and other components of the network which will facilitate the corrective action which are discussed subsequently. Alternatively manual adjustments may be made by the end user or others. Whether a corrective action is taken may or may not depend upon user input or interaction.

At block 322, the incentive calculator calculates a reward to the customer based on the decision made to impact the system. Operation of this calculator may require input from the utility that may be predefined and will utilize economic principles to attribute benefits/rewards to actions by the consumer that result in increased power generation, decreased vulnerability of network components to failure, decreased cost of system operation, to name a few examples. Various rewards may include monetary compensation or lower utility rates to name a few examples. The rewards may be displayed to the consumer by a screen in real-time or by using any alternative presentation mechanism (e.g., mail, email, and so forth). Execution then ends.

As mentioned, a corrective action may include removing and/or replacing a component of the power distribution network and appliances are considered as loads modeled on the system. In the case where for an appliance, $AP_i$ in the system will be disconnected as a remedial action, before reconfiguration of the system is performed in an attempt to pre-empt the need for restoration.

During deactivation of a component, the appliance $AP_i$ or other component in the network (e.g., a capacitive load) is performed in a reconfiguration step. The model of the appliance/component is used to determine the consequences of its removal to the state of the network. This action will be an option for the modes described herein.

Figure 4:
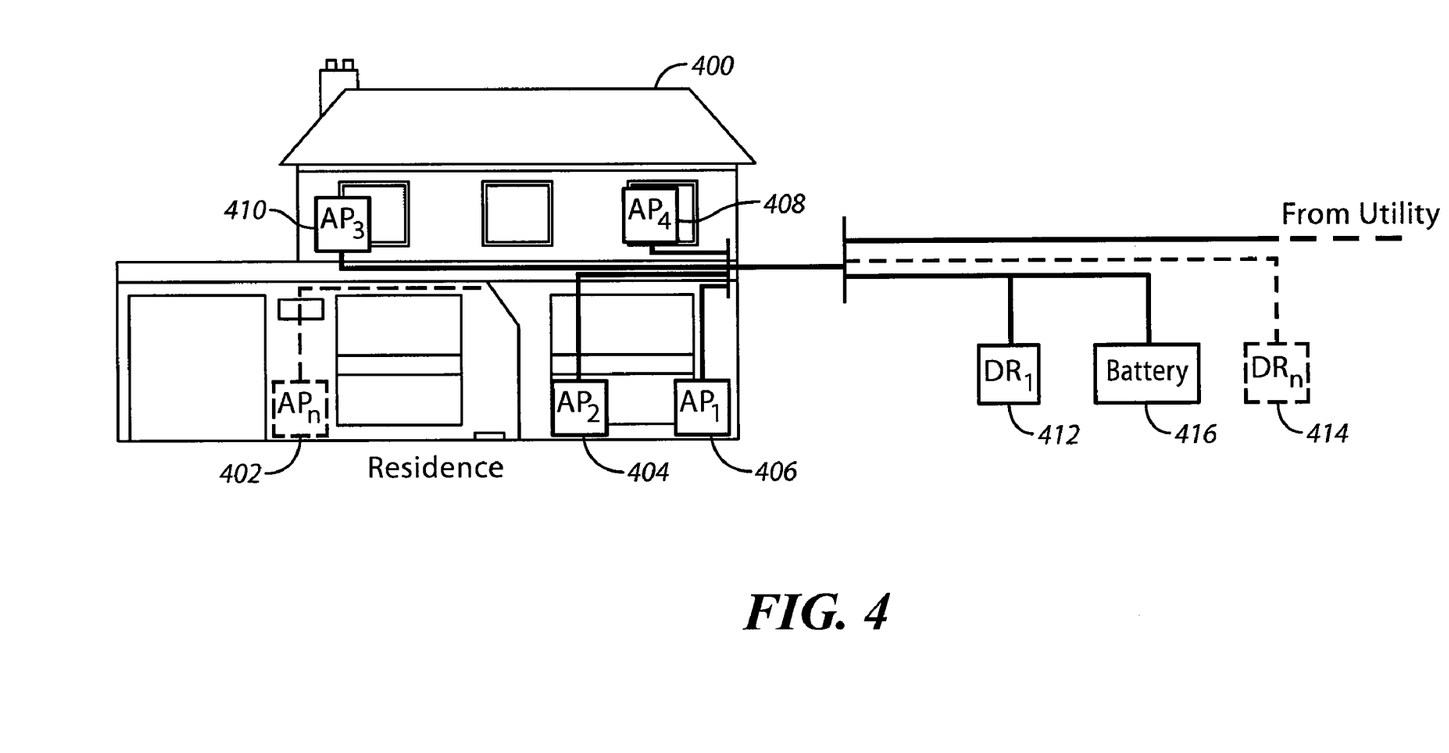
FIG. 4 comprises a diagram of a residence with a power distribution network according to various embodiments of the present invention.

Referring now to FIG. 4, the connections of appliances within a residence are described. A residence 400 includes appliances 402, 404, 406, 408 and 410. The appliances 402, 404, 406, 408, and 410 are connected to a utility and a first distributed resource 412, a second distributed resource 414, and a battery 416. In this example, it is assumed that there is at least one appliance, $AP_i$ (where i is an integer) is a member of a set of predefined appliances and can be modeled using the pre-established load models. For example:

$$AP = \begin{cases} AP_1 = \text{Refrigerator} \\ AP_2 = \text{Oven} \\ \vdots \\ AP_n = \text{appliance, } n \end{cases} \quad \begin{array}{l} AP_{i,state} \in \{\text{on, off}\}, \forall \, i \in \{1, \ldots, n\} \\ AP_{i,model} \in \{LT_1, LT_2, LT_3 \ldots, LT_n\} \end{array}$$

For this example, it is also assumed that the distributed resources/generators available are either standalone or grid connected and can be modeled, as previously established. For example:

$$DR = \begin{cases} DR_1 \\ DR_2 \\ \vdots \\ DR_n \end{cases} \begin{vmatrix} DR_{i,state} \in \{on, off\}, \forall i \in \{1, \ldots, n\} \\ DR_{i,connect} \in \{standalone, grid\ connected\} \\ DR_{i,model} \in \{DR_{PV}, DR_{WP}, \ldots\} \end{vmatrix}$$

In these examples, the appliances may include a television, a radio, a refrigerator, an oven, a microwave, a washer, a dryer, and other selected equipment. Other examples of appliances are possible.

Figure 5:
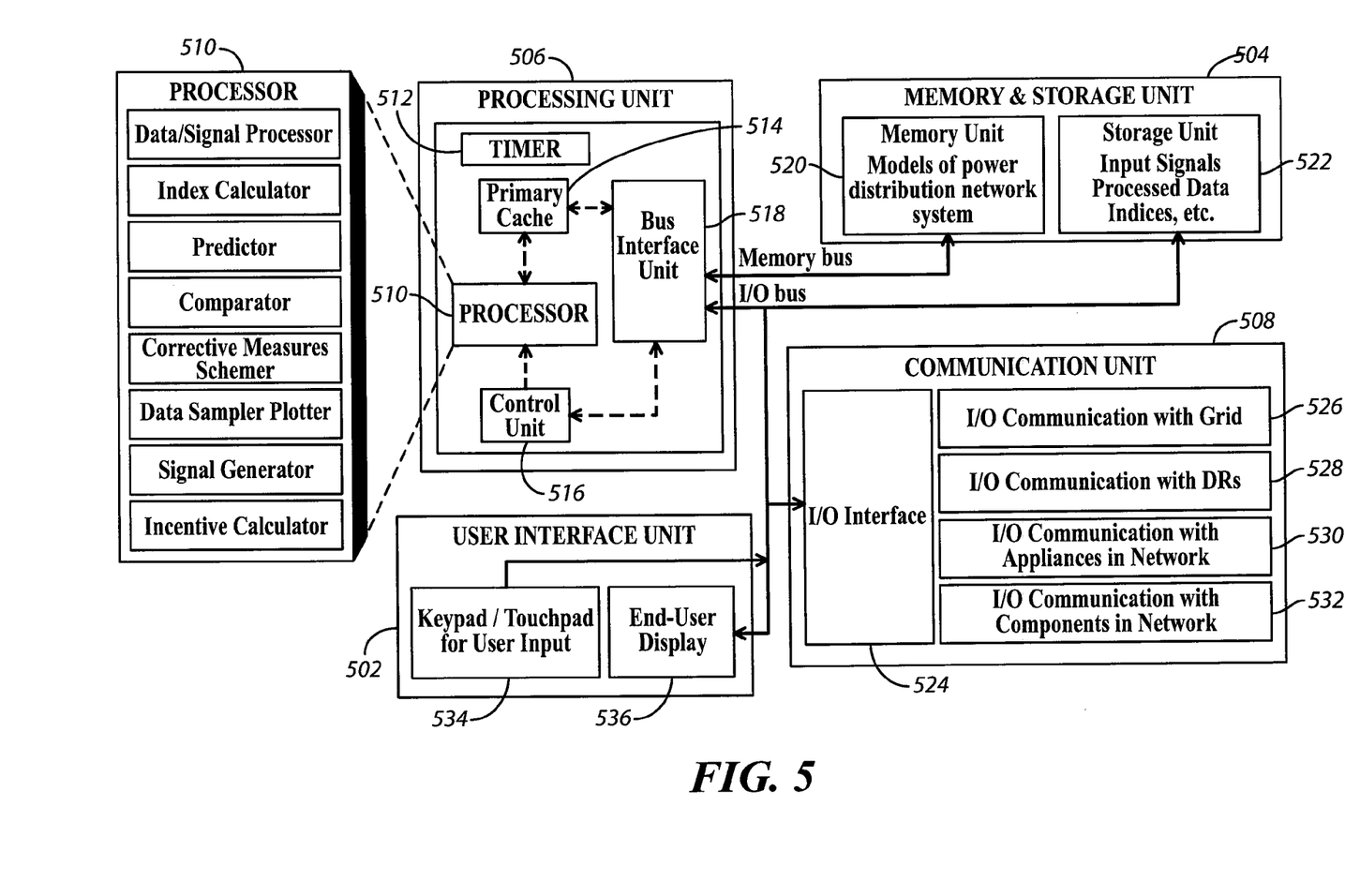
FIG. 5 comprises a block diagram of one example of an apparatus for monitoring and optimizing power quality according to various embodiments of the present invention.

Referring now to FIG. 5, one example of a power monitoring and optimization apparatus 500 is described. The power monitoring and optimization apparatus 500 includes an interface 502 having an output. The power monitoring and optimization apparatus 500 also includes a memory 504 comprising a model for a power distribution network, and a processing unit 506 coupled to the interface 502 and the memory 504. The processing unit 506 receives inputs via the interface 502 that indicate a power quality associated with the network or operation of the network. The processing unit 506 is arranged and configured to determine whether the measured quality meets a predetermined performance criteria. The processing unit 506 is further configured to predict a future operational performance of the power distribution network based at least in part upon a model (contained in the memory 504). When the quality of the operation of the power distribution network or the predicted future performance do not meet the predetermined performance criteria, the processing unit 506 initiates the taking of a corrective action at the output (e.g., by sending a command signal to an appliance at the output). The action may be automatic or the user may be allowed to select (and/or perform) the action. A communication unit 508 is coupled to the processing unit 506, memory 504, and interface 502.

The processing unit 506 includes a microprocessor 510 that executes control functions, processing functions, and facilitates interfacing with the other elements in the apparatus 500. A timer 512 (configured to perform timing functions), a primary cache 514 (configured to provide temporary memory storage), a control unit 516 (configured to control and/or coordinate operation of the elements of the processing unit 506), and a bus interface unit 518 (configured to receive and send information to and from the memory and input/output buses) are also provided.

The processor 510 is embedded with the code for operation of the entire process as identified above with respect to FIG. 3. More specifically, operators for processing, index calculation, correction action scheming, prediction, signaling and incentive calculation are loaded into the processor and/or stored in a memory (e.g., memory and storage unit 504) associated with the processor 510.

The memory and storage 504 contains models of the power distribution network, as well as store processed input signals, data, indices, and so forth. The communication unit 508 includes an I/O interface 524, an I/O communication with grid module 526, an I/O communication with DRs module 528, and I/O communication with appliances module 530, and an I/O communication with components on network module 532. The I/O interface 524 and modules 526, 528, 530, and 532 facilitate signaling from the user interface unit/ console as well as with the power grid, distributed resources (whether stand alone or grid connected), components and appliances within the network. The communication unit 508 contains components of the system that facilitate the passage of signals to and from each component on the network and the utility. I/O Ports are provided for the appliances, distributed resources, generators and other components on the network (e.g., capacitive loads, regulators, switches, circuit breakers, and so forth).

The end user display 536 includes a keypad/touchpad 534 for user input and an end user display 536. The end user display 536 may be a video screen, printer, or any type of presentation arrangement. Through WIFI/Ethernet communication, display output can be accessed through PC laptops and other suitable media devices. The unit 502 facilitates the provision of options and the associated implications/rewards to the system. Consequently, customers are allowed to make informed decisions in regards to their consumption and use of electricity. Since many customers are not inclined to respond to purely numerical data, graphical representations of decision making data may be provided at the end user display 536, along with options available for improvement of power quality for the system. The customer can then select the option they desire and these options can be automatically and/or manually executed to improve the power quality of the system. Examples of these options have been described elsewhere herein and will not be repeated here. It will be appreciated that any type of user interface (e.g., switches, buttons, a touch screen) may be used to receive user input.

In addition, where a consumer rewards program is used, the cost benefit/reward can also be indicated to the customer. For example, the consumer may be informed of the cost savings/ rewards for undertaking various power quality improvement options. If a consumer is to be rewarded for selecting these options, these rewards may also be presented to the consumer or user. Further, if costs or penalties are to be incurred by the user for non-compliance, these can also be indicated to the user.

Figure 6:
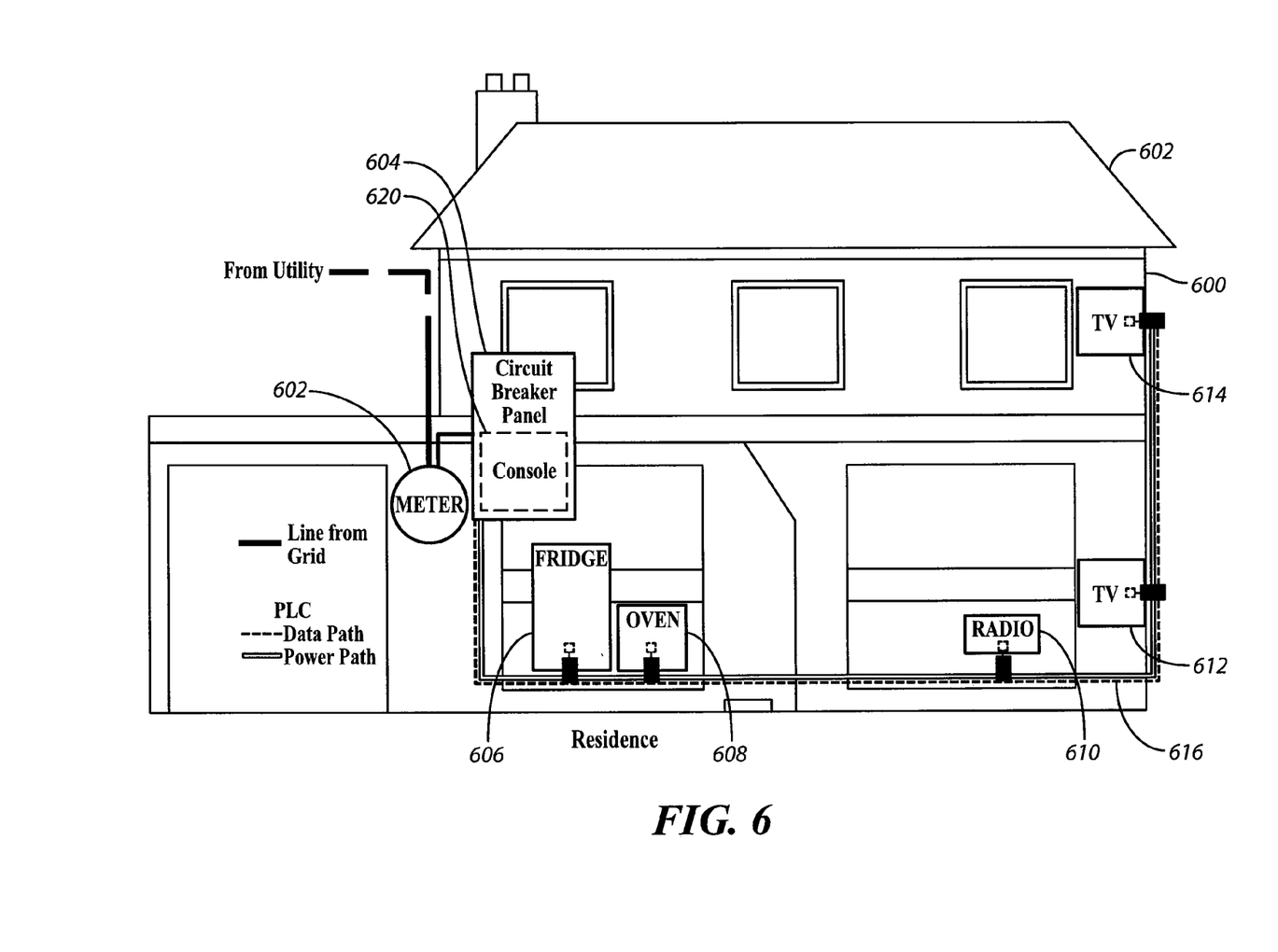
FIG. 6 comprises a diagram of a residence with a power monitoring and optimization apparatus according to various embodiments of the present invention.

Referring now to FIG. 6, a network showing appliance placement in a residence 600 is described. The network within the residence 600 includes a meter 602, a circuit breaker panel 604, a refrigerator 606, an oven 608, a radio 610, a first television 612, and a second television 614. A power monitoring and optimization apparatus 620 is installed at the circuit breaker panel 604. Power from the utility is input to the circuit breaker panel 604 via the meter 602.

As shown in FIG. 6, power line communication (PLC) 616 is utilized within the residence 600 for data communication to and from the power monitoring and optimization apparatus 620 and amongst the appliances 606, 608, 610, 612, and 614. As seen in FIG. 6, the power monitoring and optimization apparatus 620 is located in the proximity of the breaker panel 604 and meter 602.

Various sensors (not shown) may be located at the various elements described above (or at other locations within the network). The sensors may send their information to the power monitoring and optimization apparatus 620. The power monitoring and optimization 620 may allow users to take actions or the power monitoring and optimization apparatus 620 may automatically take or order an appliance to take a corrective action. Although the example of FIG. 6 shows only one power monitoring and optimization apparatus 620, it will be appreciated that any number of these modules may be used and their placement can vary throughout the network or within devices attached to the network. The economic or other rewards for power optimization may also be presented to a user. Additionally, the user may be rewarded for selecting various optimization choices or punished for taking (or not taking) corrective actions.

Thus, approaches are provided that measure and optimize the quality of power in a network or a portion of a network and allow a user to make real-time adjustments to the configuration, loading, and/or other operating characteristics of the network in order to maintain or achieve an adequate power quality. The approaches described herein are flexible, user-friendly, and prevent damage to network devices and/or inefficiencies in network operation from occurring. Further, the user or consumer may some measure of control over their power quality and rewards may be provided to the consumer or user for behavior that optimizes power quality. In addition, punishments (e.g., increased service rates) may also be indicated if a user refuses to take a corrective action, thereby negatively impacting system performance for that user and/or other users.

While the invention herein disclosed has been described by means of specific embodiments and applications thereof, numerous modifications and variations could be made thereto by those skilled in the art without departing from the scope of the invention.

What is claimed is:

1. A method for optimizing power quality in a power distribution network, the method comprising:
   modeling an operation of a power distribution network;
   measuring at least one characteristic associated with at least one of a cleanliness of power of the power distribution network or a reliability of power of the power distribution network;
   determining whether the at least one characteristic meets a first predetermined performance criteria;
   predicting a future operational performance of the power distribution network based at least in part upon the modeling and determining whether the future operational performance meets a second predetermined performance criteria;
   in response to determining the at least one characteristic associated with the operation of the power distribution network does not meet the first predetermined performance criteria or the predicted future operational performance of the power distribution network does not meet the second predetermined performance criteria, taking a corrective action with respect to the power distribution network to improve at least one of the cleanliness of power of the power distribution network or the reliability of power of the power distribution network.

2. The method of claim 1 wherein taking a corrective action comprises removing and replacing a component of the power distribution network.

3. The method of claim 1 wherein taking a corrective action comprises deactivating a component of the power distribution network.

4. The method of claim 1 wherein the power distribution network is positioned in a home and further comprising coupling at least one appliance to the power distribution network.

5. The method of claim 4 further comprising determining an adjustment of an operation of the at least one appliance connected in the power distribution network and communicating the adjustment to the at least one appliance utilizing an existing component of the power distribution network.

6. The method of claim 4 wherein the appliance is selected from the group consisting of a television, a radio, a refrigerator, an oven, a microwave, a washer, and a dryer.

7. The method of claim 1 further comprising presenting a choice of the corrective action to a user.

8. The method of claim 1 further comprising offering a reward for taking a corrective action.

9. An apparatus for optimizing power quality, the apparatus comprising:
   an interface having an input and output;
   a memory comprising a model of a power distribution network;
   a processor coupled to the interface and the memory, the processor arranged and configured to:
      model an operation of a power distribution network using the model in memory,
      determine whether a characteristic associated with at least one of a cleanliness of power of the power distribution network or a reliability of power of the power distribution network received via the input of the interface meets a first predetermined performance criteria,
      predict a future operational performance of the power distribution network based at least in part upon the model,
      determine whether the future operational performance meets a second predetermined performance criteria,
      in response to determining that the at least one characteristic of the power distribution network does not meet the first predetermined performance criteria or the future operational performance does not meet the second predetermined performance criteria, transmit a signal instigating a corrective action to improve at least one of the cleanliness of power of the power distribution network or the reliability of power of the power distribution network.

10. The apparatus of claim 9 wherein the instigating a corrective action comprises transmitting a signal at the output to automatically alter the operation of at least one consumer device.

11. The apparatus of claim 9 wherein the instigating a corrective action comprises presenting a corrective action to a user and receiving user input as to the corrective action to take.

12. The apparatus of claim 9 wherein the apparatus is disposed within an appliance in a building.

13. The apparatus of claim 12 wherein the appliance is selected from the group consisting of a television, a radio, a refrigerator, an oven, a microwave, a washer, and a dryer.

14. The apparatus of claim 9 wherein the output of the interface is coupled to at least one power line to communicate with another apparatus.

15. The apparatus of claim 9 wherein the apparatus comprises a device separate from an existing component of the power distribution network.

16. The apparatus of claim 9 wherein the output of the interface is coupled to at least one power line, the power line coupled to an appliance.

17. The apparatus of claim 9 wherein the processor is further configured to offer a reward to a user for taking a corrective action.

* * * * *